United States Patent [19]

Sehgal et al.

[11] Patent Number: 5,772,735
[45] Date of Patent: Jun. 30, 1998

[54] SUPPORTED INORGANIC MEMBRANES

[75] Inventors: Rakesh Sehgal; Charles Jeffrey Brinker, both of Albuquerque, N. Mex.

[73] Assignees: University of New Mexico; Sandia Natl Laboratories, both of Albuquerque, N. Mex.

[21] Appl. No.: 896,716

[22] Filed: Jul. 18, 1997

Related U.S. Application Data

[63] Continuation of Ser. No. 551,956, Nov. 2, 1995, abandoned.

[51] Int. Cl.⁶ .................................................. B01D 53/22
[52] U.S. Cl. ..................... 95/45; 96/4; 96/10; 210/490;
210/496; 210/500.25; 210/500.26; 210/506;
210/510.1; 265/42; 265/43; 265/621; 501/12;
501/80; 501/85
[58] Field of Search ............................. 210/490, 500.25,
210/500.26, 496, 510.1, 506; 502/4; 427/244,
245, 246, 247; 95/45; 96/4, 11; 264/42,
43, 600, 621; 501/12, 80, 85

[56] References Cited

U.S. PATENT DOCUMENTS

| | | | |
|---|---|---|---|
| 4,699,892 | 10/1987 | Suzuki | 502/4 |
| 5,137,634 | 8/1992 | Butler et al. | |
| 5,362,522 | 11/1994 | Barri et al. | 427/435 |
| 5,439,624 | 8/1995 | Anderson et al. | 264/66 |

OTHER PUBLICATIONS

Sehgal, "Preparation and Characterization of Ultrathin Sol--Gel Derived Silica Membranes for Gas Separation Applications", Master's Thesis, University of New Mexico, May 1993.

Brinker et al., "Ultramicroporous Silica–Based Supported Inorganic Membranes", J. Membrane Science (1993), 77:165–179.

Brinker et al., "Sol–gel Strategies for Controlled Porosity Inorganic Materials", J. Membrane Sciences (1994), 94:85–102.

Brinker et al., "Polymer Approach to Supported Silica Membranes", J. Sol–Gel Science and Technology (1994), 2:469–476.

Srinivasan et al., "Interaction of Titanium Isopropoxide with Surface Hydroxyls on Silica", J. Catalysis (1994), 145:565–573.

Sabate et al., "Nature and Properties of Pure and Nb–Doped $TiO_2$ Ceramic Membranes Affecting the Photocatalytic Degradation of 3–Chlorosalicylic Acid as a Model of Halogenated Organic Compounds", J. Catalysis (1992), 134:36–46.

Sabate et al., "A Kinetic Study of the Photcatalytic Degradation of 3–Chlorosalicylic Acid over $TiO_2$ Membranes Supported on Glass", J. Catalysis (1991), 127:167–177.

*Primary Examiner*—W. L. Walker
*Attorney, Agent, or Firm*—William S. Galliani; Flehr Hohbach Test Albritton & Herbert LLP

[57] ABSTRACT

Supported inorganic membranes capable of molecular sieving, and methods for their production, are provided. The subject membranes exhibit high flux and high selectivity. The subject membranes are substantially defect free and less than about 100 nm thick. The pores of the subject membranes have an average critical pore radius of less than about 5 Å, and have a narrow pore size distribution. The subject membranes are prepared by coating a porous substrate with a polymeric sol, preferably under conditions of low relative pressure of the liquid constituents of the sol. The coated substrate is dried and calcined to produce the subject supported membrane. Also provided are methods of derivatizing the surface of supported inorganic membranes with metal alkoxides. The subject membranes find use in a variety of applications, such as the separation of constituents of gaseous streams, as catalysts and catalyst supports, and the like.

40 Claims, No Drawings

SUPPORTED INORGANIC MEMBRANES

This is a continuation of U.S. patent application Ser. No. 08/551,956 filed Nov. 2, 1995, now abandoned.

INTRODUCTION

1. Field of the Invention

The field of this invention relates generally to membranes used for molecular sieving, more particularly the invention relates to stable supported inorganic membranes providing high sieving flux and selectivity.

2. Background

Membranes are semi-permeable, porous materials that find use in a variety of applications, including separation and catalysis, finding use as reactors, sensors, adsorbents and the like. In separation applications such as the separation of gaseous streams, membranes offer extensive energy savings over other separation processes such as evaporation, distillation and adsorption, and are therefore preferred in many situations.

Most current commercial membranes are prepared from organic polymers. The prevalence of organic membranes is a result of the low cost of production and ease of processability of these membranes. However, despite the prevalence of organic membranes, organic membranes cannot be employed in many applications. For example, the majority of organic membranes cannot be used at temperatures in excess of 120° C. Furthermore, organic membranes may be swelled in organic solvents and/or susceptible to chemical attack. In addition to these limitations, organic polymer membranes are "nominally dense," i.e. they have "no permanent" porosity. Transport through organic membranes occurs by solution/diffusion which relies on temporal fluctuations in free volume. Thus, with organic membranes there is a tradeoff between flux and selectivity, with organic membranes of high flux being relatively non-selective. These factors limit the usefulness and applicability of organic membranes.

Inorganic membranes have the potential to overcome many of the problems associated with organic membranes. Inorganic membranes are operable to temperatures in excess of 500° C., are not swelled in solvents, and are often stable towards chemical attack, e.g. oxidation. In addition, inorganic membranes can potentially exhibit permanent porosity capable of sustaining very high flux with sufficiently small pores and narrow pore radius distributions necessary for high selectivity.

Inorganic membranes that have been prepared and employed for separation include membranes fabricated from zirconium hydroxide and polyacrylic acid on carbon or ceramic supports. Other inorganic membranes that have been developed include the asymmetric α- and γ-$Al_2O_3$ sold under the trade name of Membralox® (US Filter, 181 Thorn Hill Rd., Warrendale, Pa. 15086).

Despite the promise of inorganic membranes, it has proven difficult to prepare supported ultrathin inorganic membranes with small pores, narrow pore radius distributions, and the absence of cracks or other "defects" which detract from selectivity. To date, inorganic membranes are often prepared through sol-gel deposition of metal oxides. Sol-gel depositions can be divided into two categories: colloidal (or particulate) and polymeric. The two techniques of deposition employ either colloidal particles or inorganic polymers/oligomers, where the particles or polymers are deposited on a porous support material, e.g. α-alumina or γ-alumina.

For deposition of the particulate membranes, the final pore size is determined by the size of the primary particles (smaller particles lead to smaller pores), and the porosity is typically 30 to 50% (independent of pore size). The membranes deposited by this route have not been capable of molecular sieving. When attempts are made to further reduce the pore size of the membrane by further reducing the particle size, cracking of the resultant film during drying often occurs. Phase transformation and grain growth which also coarsen (enlarge) the pore size with moderate heat treatment are additional problems that have been associated with particulate membranes.

Although polymer deposition techniques overcome some of the problems experienced with particulate produced films, e.g. grain growth leading to defects, films produced through polymeric deposition techniques have not yet been capable of true molecular sieving characteristics.

Thus, there is interest in the development of methods of preparing thin inorganic membranes which are free from defects and exhibit molecular sieving characteristics. Inorganic membranes of interest would preferably provide for high flux and high selectivity, and be relatively stable over a wide range of physical and chemical conditions.

Relevant Literature

U.S. patents reporting the preparation of inorganic composite membranes include U.S. Pat. No. 5,137,634.

The preparation of thin, inorganic membranes is also reported in: Brinker et al., "Ultramicroporous' Silica-based Supported Inorganic Membranes," J. Membrane Sci. (1993) 77:165–179; R. Sehgal, "Preparation and Characterization of Ultrathin Sol-gel Derived Silica Membranes for Gas Separation Application," M. S Thesis, The University of New Mexico, 1993; Brinker et al., "Sol-gel Strategies for Controlled Porosity Inorganic Materials," J. Membrane Science (1994) 94: 85–102; Brinker et al., "Polymer Approach to Supported Silica Membranes," J. Sol-gel Science and Technology (1994) 2: 469–476.

Surface derivatization of silica is reported in: Srinivasan et al., "Interaction of Titanium Isopropoxide with Surface Hydroxyls on Silica," J. Catal. (1994) 145: 565–573; Porous titania membranes combining separation and catalysis are reported in Sebate et al., "Nature and Properties of Pure and Nb-Doped $TiO_2$ Ceramic Membranes Affecting the Photocatalytic Degradation of 3-Chlorosalicylic Acid as a Model of Halogenated Organic Compounds," J. Catal. (1992) 134: 36–46; and Sebate et al., "A Kinetic Study of the Photocatalytic Degradation of 3-Chlorosalicylic Acid over $TiO_2$ Membranes Supported on Glass," J. Catal. (1991) 127: 167–177.

SUMMARY OF THE INVENTION

Supported inorganic membranes capable of molecular sieving, as well as methods for their production, are provided. The subject inorganic membranes are less than about 100 nm thick, have pores with an average critical pore radius of less than about 5 Å, and have a narrow pore radius distribution. The subject membranes are prepared by coating a porous surface with a polymeric sol, preferably under conditions of low relative pressure of the liquid constituents of the sol. After deposition, the sol coated support is dried and calcined to provide the subject supported inorganic membrane. Also provided is a method for derivatizing the surface of supported inorganic membranes with a metal alkoxide for modulating the pore surface chemistry and/or pore size of the subject membranes.

DESCRIPTION OF THE SPECIFIC EMBODIMENTS

Supported inorganic membranes capable of molecular sieving, as well as methods for their preparation and use, are provided. The subject inorganic membranes are less than about 100 nm thick, have pores having an average critical pore radius of less than about 5 Å and have a narrow pore radius distribution. The subject membranes are prepared by coating a porous substrate with a polymeric sol. After deposition, the sol coated substrate is dried, preferably under conditions of low relative pressure of the liquid constituents of the sol, and calcined to provide the subject supported inorganic membrane. Also provided is a method for derivatizing the surface of supported inorganic membranes, such as the subject membranes, with a metal alkoxide. In further describing the subject invention, first the method of preparing the subject membranes will be discussed in greater detail, followed by a description of the process of derivatizing the surface of supported inorganic membranes with a metal alkoxide.

The subject membranes are prepared by coating a porous support with an inorganic polymeric sol. Polymeric sols which find use in the subject invention are those sols which are stable under the conditions in which they are employed, and have a viscosity which provides for deposition of a thin sol coating on the support. The viscosity of the sol will generally range from about 1 to 20 cps, usually from about 1 to 5 cps, more usually from about 1.2 to 1.5 cps.

The polymeric sol will comprise a colloidal dispersion of inorganic polymers in a liquid, where the liquid may be a single component, e.g. $H_2O$ or an alcohol, or a multi-component, normally miscible, mixture, e.g. alcohol-water and the like. The inorganic polymers will have a low mass fractal dimension ($D_f$) and be sufficiently large so that the inorganic polymers are captured, at least in part, on top of the underlying substrate. Generally, the $D_f$ of the sols will not exceed 2, and will usually not exceed 1.8, and will be at least about 1.1, usually at least 1.5. The diameter of the inorganic polymers as measured by small angle scattering will be at least equal to, and will usually be greater than, the diameter of the pores in the underlying substrate, and may be up to 2 times, more usually up to 1.5 times the diameter of the pores of the underlying substrate. The concentration of the inorganic polymers in the liquid component of the sol will be sufficient to provide for a sol with the desired viscosity, as described above. Generally, the concentration of the inorganic polymers in the liquid component of the sol will range from 0.45 to 0.69, usually 0.59 to 0.63, more usually 0.60 to 0.62 moles/liter.

The liquid component of the sol will often comprise water in combination with at least one, usually not more than three, more usually not more than two, organic solvents. Water present in the liquid component will usually be deionized and will be present in about 2.5% to 13% (v/v), usually 5.7 to 6.0% (v/v) of the total liquid component of the sol. A variety of organic solvents will normally be combined with the water to produce the liquid component of the sol. At least one of the organic solvents will be an alkanol, usually a lower alkanol of from 2 to 8 carbon atoms, usually 2 to 6 carbon atoms, more usually 2 to 4 carbon atoms. The alkanol may be an alcohol or polyol, where the number of hydroxy groups does not exceed the number of carbon atoms, and where there is usually not more than one hydroxy group for every 1.5 carbon atoms. Illustrative alkanols which find use as organic solvents in the subject sols are ethanol, usually absolute ethanol, methanol, iso-propanol, and the like. The alkanol will be present in the liquid component of the sol in an amount ranging from about 77 to 82% (v/v), usually from about 80 to 80.5%(v/v) of the liquid component in the sol. Generally, the ratio of alkanol to water in the liquid component of the sol will range from 6 to 32, usually from about 13.5 to 14.5. Other organic solvents, in addition to the alkanol, may also be present in the subject sols, where the liquid component of the sol comprises more than one organic solvent. These other organic solvents may be straight chained, branched or cyclic, and will usually comprise from about 2 to 10 carbon atoms, more usually 4 to 8 carbon atoms. The organic solvents may comprise one or more heteroatoms, usually not more than three heteroatoms, where the heteroatom may be selected from oxygen, sulfur, nitrogen and the like. Illustrative non-alkanol organic solvents which may be present in the liquid component of the sol include hexane, toluene, tetrahydrofuran, acetone and the like. When present in the subject sols, these non-alkanol organic solvents will be present in amounts ranging from 5 to 99% (v/v) of the total liquid component.

The subject inorganic polymeric coating sols are prepared by combining metal alkoxide monomers with the liquid components of the sol, as described above, in the presence of a catalyst, either acid or base, with agitation to provide a substantially uniform dispersion of the metal alkoxide monomers in the liquid components. Metal alkoxide monomers that find use in preparation of the subject sols are those monomers having the formula:

$$M(OR)_n \text{ or } MR'_x(OR)_{n-x}, \text{ usually } M(OR)_n,$$

wherein:

M is a metal having a coordination number in excess of 3, i.e. >3, and is selected from the group comprising Si, Al, Ti, Zr and the like, preferably Si;

OR is a hydrolyzable alkoxy ligand, where R usually has the formula:

$$C_zH_{2z+1},$$

wherein:

z is from 1 to 4, usually from 1 to 2;

n is usually from 3 to 4; and

R' is a non-hydrolyzable organic ligand or other oligomeric oxoalkoxide having from 1 to 4 carbon atoms, usually from 1 to 2 carbon atoms.

For electropositive metals, e.g. Ti and Zr, the metal alkoxide monomer may be modified to reduce the effective functionality and/or rate of hydrolysis and condensation and thereby prevent particle formation under the sol preparation conditions. To reduce the effective functionality and/or rate of hydrolysis and condensation, the metal alkoxides may be modified by any convenient means, such as chelation with slowly hydrolyzing multidentate ligands, e.g. actylacetonate, alcohol amines, and the like.

Catalysts that find use include mineral acids and bases, including HCl, $H_2SO_4$, $HNO_3$, $NH_4OH$, and the like. In the present invention, often the catalyst is added in sufficient concentration to cause the average condensation rate of the hydrolyzed alkoxide species to be minimized.

Agitation of the metal alkoxide, water, catalyst and organic solvent(s), i.e. the sol precursors, is maintained for a sufficient time to provide for a uniform dispersion of the metal alkoxide in the liquid constituents. Usually the sol precursors will be mixed for a period of time ranging from 5 to 20 min, more usually 14 to 15 min. Mixing may be accomplished by any convenient means, such as stirring, shaking and the like.

The resultant mixture of sol precursors is then allowed to set or age for a sufficient time under conditions of low condensation rate to produce a sol comprising inorganic polymers having the desired size and fractal dimensions. The condensation conditions, i.e. the rate at which the monomers are hydrolyzed and then condensed into the polymeric fractal clusters, depends on a variety of factors, such as the reactivity of the alkoxy ligands of the metal alkoxide monomers, the temperature at which the sol is maintained, the pH of the sol precursor, and the like. Thus, the temperature and pH of the combined sol precursors will be selected in view of the reactivity of the alkoxy ligands of the metal alkoxy monomers, to achieve conditions of low but finite condensation rate. Although the selected temperature and pH will vary depending on the particular metal alkoxy monomers employed, generally the temperature will range from about 35° to 70° C., usually from about 40° to 60° C., and more usually from about 48° to 52° C. The temperature of the aging precursor may be controlled using any convenient temperature control means, such as a heating or cooling means, or the like. The pH of the sol precursor composition will generally range from 0 to 5, usually from about 1 to 3, more usually from about 1.5 to 2.5. For silica sols, the pH of the precursor solution may be controlled by introducing to the precursor an acid or basic catalyst, such as HCl, $HN_3$, $NH_4OH$ and the like, in sufficient amount to modulate the pH (specifically the $-\log[H_3O^+]$) of the precursor to the desired value.

The precursor sol is sealed and allowed to set or age under the conditions of low condensation rate for a period of time sufficient to provide for the formation of extended polymeric networks capable of interpenetration and having the desired fractal dimensions. Usually, the sol will be allowed to set in a closed container for a period of time ranging from about 0 to 140 hrs, more usually from about 10 to 24 hours.

Of particular interest is the preparation of a silica polymeric coating sol by a two stage process, in which the pH of the sol is decreased from the first to the second stage. In the first stage of this two stage sol production process, a silicon alkoxide, e.g. tetraethoxysilicate, is combined with an alkanol and water with agitation to produce a precursor sol. The amount of silicon alkoxide which is combined with the alkanol and water to produce the precursor sol will range from 1.0 to 2.0 mol/liter, usually from about 1.7 to 2.0 mol/liter. The amount of alkanol present in the precursor sol will range from 30 to 70% (v/v), usually 45 to 50% (v/v), and the amount of water present in the precursor sol will range from 2 to 10% (v/v), usually 3.5 to 4.5% (v/v). In this first stage, agitation is continued for a period of 30 to 120 min., usually 60 to 90 min. During this first stage, the pH of the precursor sol is maintained at a value between 3 and 6, usually between 4 and 5 as measured by using an indicator strip, by including in the precursor sol a sufficient amount of an acid catalyst. Any convenient acid catalyst may be employed, including $HNO_3$, HCl and the like. In this first stage, the molar ratio of the four components of the sol precursor, i.e. silicon alkoxide:alkanol:water:acid catalyst, will be $0.8–1.2:3.5–4:0.8–1.2:1.0\times10^{-5}–9.0\times10^{-5}$.

In the second stage of the two stage sol preparation process, the pH of the precursor sol will be reduced by ⅓ to ½. To reduce the pH of the precursor sol, a sufficient amount of water and acid catalyst will be introduced to the precursor sol. Following introduction of the water and acid catalyst, the pH of the precursor sol will be reduced to between about 1 and 3, usually between about 1.5 and 2.5. In the second stage, a sufficient amount of water and acid precursor are added to the precursor sol to change the molar ratio of the four components to $0.8–1.2:3.5–4:4.5–5.5:0.001–0.009$. Following introduction of the acid catalyst and water, the precursor sol will be agitated for a period of time ranging from 10 to 30 min, usually from 10 to 20 min. Following agitation, the precursor sol will be allowed to set or age at an elevated temperature for a period of time sufficient for the coating sol to be produced. Generally, the incubation temperature will range from 40° to 60° C., usually from 45° to 55° C. The setting period will range from 12 to 36 hours, usually 12 to 24 hours. The resultant silica coating sol will comprise silica polymers of low fractal dimension.

A variety of substrates may be employed as porous supports for the inorganic membrane. Substrates that may be employed will have pore sizes which are sufficiently large so that the substrate itself does not contribute to the sieving properties of the supported membrane. Generally, the pores of the substrate will have diameters at least 5 times larger than the pores of the inorganic film to be deposited on the substrate, normally at least 8 times larger, and not more than 15 times larger, usually not more than 12 times larger than the pores of the inorganic film to be deposited. The substrate pores will usually have diameters ranging in size from about 30 to 60 Å, usually from about 40 to 50 Å.

The substrate which serves as the support should be thermally, chemically and mechanically stable during sol deposition, thermal processing and membrane use. Thus, substrates that can be employed include oxides, e.g. $TiO_2$, $Al_2O_3$, $ZrO_2$, hydroxides, e.g. AlOOH, as well as porous metals, such as stainless, and the like. The substrates may have any convenient shape, such as square, rectangular and cylindrical, as well as other more complicated shapes, where the shape chosen will depend primarily on the intended use of the final supported inorganic membrane. The substrates may be prepared using methods known in the art, i.e. deposition of particulate sols, or obtained from commercial sources. Commercially available substrates capable of acting as supports for the inorganic films of the subject invention include those available from U.S. Filter, e.g. Membralox® (a cylindrical substrate comprising a γ-$Al_2O_3$ inside layer having pores ranging in diameter from 40 to 50 Å), Golden Technologies, and the like. As necessary and desirable, prior to use, the substrate may be calcined to pyrolize any organic compounds present on the support and desorb any water from the support. Calcination will generally be carried out at temperatures ranging from 300° to 500° C., usually 350° to 450° C.

In preparing the subject membranes, the precursor sol will be deposited onto the surface of the substrate to produce a coated substrate that is then dried and calcined to yield the subject supported inorganic membrane. Deposition of the sol onto the substrate is achieved by contacting the substrate with the sol so that the sol coats the substrate in a layer capable of collapsing with drying to produce a thin film. The substrate may be contacted with the sol using any convenient means, such as dip-coating, infiltration, spin-coating, spraying and the like.

After deposition, the sol coated substrate will be allowed to dry. The coated substrate will be dried under at least relatively dry conditions, i.e. in an atmosphere having low humidity. By relatively dry is meant that the amount of water in the atmosphere will generally not exceed 1000 ppm, usually not more than 100 ppm. Relatively dry conditions may be achieved by depositing the sol on the substrate in a dry box, or other environment in which a relatively dry atmosphere can be maintained. The coated support will be dried for a sufficient period of time so that the solvent contained in the underlying support, along with substantial solvent in the membrane, evaporates, resulting in a thin, inorganic film deposited on the support surface. Generally, the sol coated support will be dried for a period of time ranging from 5 to 120 min, usually 10 to 20 min, more usually 14 to 15 min.

The deposition and drying process, i.e. the coating process, may be repeated one or more times, as desired, to produce a membrane comprising a plurality of inorganic polymeric coating layers on the support. It is found that under certain conditions, having at least two polymeric layers can provide for membranes with better sieving characteristics, i.e. greater selectivity, with fewer defects. Where a plurality of polymeric layers are coated onto the substrate, the number of layers will be at least 2 and will usually not exceed more than 4, more usually not more than 3.

Of particular interest is drying the deposited sol under conditions of low relative pressure of the fluid constituents of the coating sol. Under conditions of low relative pressure of the fluid constituents of the coating sol, the drying atmosphere will be substantially anhydrous. By substantially anhydrous is meant that the water content of the atmosphere in which drying occurs is maintained at less than 10 ppm, usually less than 5 ppm, and more usually less than 1 ppm. Under the conditions of low relative pressure, the amount of the alkanol and other organic solvents constituents of the liquid component present in the atmosphere will be maintained at less than 1000 ppm, preferably less than 100 ppm. Conditions of low relative pressure of the fluid constituents of the coating sol can be achieved using any convenient means, such as purging the atmosphere in which drying occurs with dry nitrogen, argon and the like.

The dried, coated substrate is then calcined to produce the subject supported inorganic membrane. The coated substrate will generally be calcined to a temperature between about 350° to 650° C., usually between about 400° to 600° C., and preferably from about 500° to 600° C. During calcination, the rate at which the temperature is raised will range from 0.5° to 5° C./min, usually between about 0.5° to 3° C./min, more usually between about 0.5° to 2° C./min. The coated substrate will be held isothermally at the highest calcination temperature for a period of time ranging from about 1 to 5 hours, usually 2 to 4 hours, after which the temperature will be decreased at a rate of 0.5° to 5° C./min, usually between about 0.5° to 3° C./ min, more usually between about 0.5° to 2° C./min.

The resultant supported inorganic membranes are capable of molecular sieving, and exhibit high flux and high selectivity. By capable of molecular sieving is meant that the membranes are capable of exhibiting substantially molecular sieving behavior, where molecular sieving behavior exists when the separation factor for a pair of gases by the membrane is greater than the separation factor for the same pair of gases in a membrane characterized by Knudsen diffusion. Thus, in the formula where $\alpha_{A/B} \propto$ (molecular weight B/molecular weight A)$^{1/2}$, where $\alpha_{A/B}$ is the separation factor of a membrane for a pair of gases, in membranes exhibiting Knudsen separation behavior, the separation factor for the pair of gases does not typically exceed 10. As the subject membranes are capable of exhibiting substantially molecular sieving behavior, the separation factor for pairs of gases will typically exceed 50, and more typically will exceed 100.

The supported inorganic membranes are substantially defect free, in that they are free of cracks, pinholes and the like. By substantially defect free is meant that the supported inorganic membranes are at least 95% defect free, usually at least 97% defect free, more usually at least 99% defect free. The supported inorganic membranes are thin, ranging in thickness from 50 to 200 nm, usually from 50 to 150 nm and more usually from 50 to 100 nm. Preferably, the thickness of the supported inorganic membrane will be less than about 100 nm. The supported inorganic membranes of the subject invention will have a narrow pore radius distribution, i.e. there will be little variance in pore radii. The pore radii of the subject membranes will be sufficiently small to provide for size exclusion of molecules, i.e. sufficiently small to provide for selective passage of certain molecules. Generally, the radii of the pores will range from about 10 to 1.25 Å, more usually from about 5 to 1.25 Å, and the critical pore radius will be less than about 5 Å, and will range from about 1.5 to 5 Å, usually from about 1.5 to 4 Å, more usually from about 1.5 to 3 Å, where the critical pore radius represents the smallest constriction in a pore pathway connecting one side of the membrane to the other.

The subject supported inorganic membranes are further characterized by exhibiting different permeance characteristics at different temperatures. Thus, as the temperature of the membrane changes, the permeance of the membrane with respect to molecules of different diameters is modulated, i.e. the membrane experiences a permeance change as the temperature of the membrane changes. In other words, at different temperatures, the same membrane will be permeant to different sized molecules. Generally, as the temperature of the membrane increases, the diameter of the molecules that can pass through the membrane also increases. The permeance change of the membrane will usually occur over a narrow temperature range, where the magnitude of the change in temperature may be from about 5° to 40° C., usually from 5° to 30° C., more usually from about 5° to 10° C. The magnitude of change in diameter size of molecules that can pass through the membrane following the permeance change will generally be from about 0.05 to 1.0 Å, more usually from about 0.10 to 0.90 Å.

The subject inorganic supported membranes find use in a variety of applications, such as catalytic membrane reactors, sensors, adsorbents and the like, as well as in the separation of constituents of gaseous streams, such as the dehydrogenation of gaseous streams, the separation of $CO_2$ and $N_2$ from $CH_4$ gaseous streams, and the like. Furthermore, because the membranes exhibit a different permeance at different temperatures, as described above, a plurality of membranes at different temperatures can be used to size separate the molecular components of a gaseous stream of small molecules. To make such a separation, the gaseous stream will be contacted with a first membrane at a first, lowest temperature, so that only the smallest molecules in the gaseous mixture pass through the membrane. The resultant remaining mixture, from which the smallest molecules have been separated, is then contacted with a second membrane at a second, higher temperature, where the second membrane has a different permeance from the first membrane, such that the next smallest molecules in the gaseous mixture pass through the second membrane and are separated from the remaining components of the gaseous stream. The process can be repeated, as desired, until only the largest molecules remain in the gaseous mixture. Thus, to size separate the molecular components of a gaseous stream of small molecules, the gaseous stream can be sequentially contacted with a plurality of membranes, where the temperature of each membrane contacted by the gaseous stream is at a higher temperature than the previously contacted membrane.

Also provided in the subject invention is a method of derivatizing the surface of supported inorganic membranes, such as the membranes prepared according to the methods described above, with a metal alkoxide, metal organic, or metal halide. For surface derivatization with a metal alkoxide, the membrane is coated with a solution of a monomeric or oligomeric metal alkoxide. The metal present in the metal alkoxide should be sufficiently electropositive so that it readily reacts with the surface hydroxyl groups of the inorganic membrane under the conditions described below. Metal alkoxides that may be employed include alkoxides of Si, Al, Ti, Zr and the like, as well as alkali derivatives thereof. Of particular interest are titanium alkoxides, as well as alkali titanium alkoxide, e.g. sodium titanium iso-propoxide. The metal alkoxide will be present in an anhydrous solvent, preferably an organic solvent. Organic solvents of interest are hexane, toluene, tetrahydrofuran and the like.

For surface derivatization, the membrane will be coated with the metal alkoxide solution under substantially anhydrous conditions. Coating is achieved by contacting the membrane with the metal alkoxide solution and then drying the contacted membrane. The membrane which is contacted with the metal alkoxide solution may optionally be exposed to water vapor prior to contact with the metal alkoxide solution so that the metal groups of the inorganic membrane are fully hydrolyzed. The membrane may be contacted with the metal alkoxide solution using any convenient means, such as by immersion of the membrane in the solution, spraying the solution onto the membrane surface and the like. By substantially anhydrous is meant that the atmosphere in which the membrane is contacted with the metal alkoxide solution has a water content generally less than 10 ppm, usually less than 5 ppm and more usually less than 1 ppm. Contact between the supported membrane and the metal alkoxide solution will be maintained for a sufficient period of time for the metal alkoxide to react with the surface groups of the inorganic membrane. Contact will usually be maintained for 1 to 10 min, more usually 2 to 8 min. Following contact, the derivatized surface will be washed to remove any unreacted metal alkoxides. The surface may be washed using any convenient, anhydrous organic solvent, including tetrahydrofuran, hexane, toluene and the like. Following washing, the surface derivatized membrane will be dried, usually for a period of time ranging from about 2 to 20 min, more usually from 2 to 10 min. During the above contacting, washing and drying steps, the substantially anhydrous nature of the atmosphere in which the membrane is present will be maintained, where substantially anhydrous has the meaning provided above. The substantially anhydrous nature of the atmosphere may be maintained using any convenient means, such as by purging the atmosphere with dry nitrogen, argon and the like.

The resultant surface derivatized membrane, which may or may not be calcined following contact with the metal alkoxide solution, will have at least a partial monolayer of metal oxide or hydroxide on its surface. In the calcination step, if employed, the surface derivatized membrane will be calcined to a maximum temperature of between about 350° and 450° C., usually between about 375° and 425° C. The rate at which the temperature of the membrane is raised and lowered will range from 0.5° to 3°/min, usually 0.5° to 2°/min.

Additional metal oxide layers, usually not more than 5, more usually not more than 3, may be deposited using the process described above in order to further modify the derivatized surface in a monolayer by monolayer fashion. The additional layers may be prepared from the same metal alkoxide solution or a different metal alkoxide solution than that which was used in the first derivatization. The thickness of the deposited layer or layers of metal oxide on the surface of the inorganic membrane will generally range from 0.5 to 30 nm, more usually from 0.5 to 12 nm.

To modulate the thickness of the deposited metal oxide layer on the surface of the membrane that results from surface derivatization with a metal alkoxide solution, prior to contact with the metal alkoxide solution, water can be provided in the pores of the supported inorganic membrane. When water is present in the pores of the inorganic membrane, when the membrane is contacted with the metal alkoxide solution, the water will diffuse through the pores to the external membrane/metal alkoxide solution, and thereby provide for the deposition of a distinct layer of metal oxide on the membrane surface. The result after calcination at 400° C. is the formation of an adherent nanocrystalline metal oxide layer on top of the derivatized membrane. The thickness of the deposited layer will range from about 0.5 to 100 nm, usually from about 10 to 40 nm, more usually from about 10 to 20 nm. Thus, by appropriate choice of metal alkoxide, inorganic membranes comprising nanocrystalline metal oxide or alkali metal oxide surfaces, e.g. titania or sodium titanate, can be obtained.

The resultant surface derivatized inorganic membranes find use in a variety of applications, including membrane reactors, catalysts, photocatalytic reactors, catalyst supports and the like.

The following examples are offered by way of illustration and not by way of limitation.

EXPERIMENTAL

Example 1

Preparation of Microporous Silica Membranes

1.A Silica Polymeric Sol-Preparation

A silica polymeric sol (labeled A2) was prepared as follows. A stock solution was prepared from tetraethoxysilane (TEOS) (Kodak), 200 proof ethanol (EtOH), deionized $H_2O$, and 0.07N HCl (diluted from Baker Analyzed® 1N HCl). The four components were mixed in a molar ratio of $1.0:3.8:1.1:5.0 \times 10^{-5}$, respectively, and refluxed at 60° C. for 90 min while stirring at 200 rpm (PMC 730 series DATA-PLATE® or a Whatman DATAPLATE® model 440P programmable digital hot plate/Stirrer, 500 ml Pyrex® resin reaction kettle with lid, Pyrex® 24/40 condenser). The pH of the prepared stock solution was measured using EM Science ColorpHast® pH paper and found to be 4.7. This A2 stock solution was very stable for a few months when stored at −30° C.

Following preparation of the A2 stock solution, water and HCl were added to an aliquot of the A2 stock solution at room temperature to give a final molar ratio of the four components equal to: TEOS:EtOH:$H_2O$:HCl of 1.0:3.8:5.0:0.004 (pH=2.0). The resultant sol was agitated for 15 minutes using a wrist action shaker (Burrell Model 75 Wristaction shaker) and left undisturbed in an oven at 50° C. (Delta 9039 oven with 9010 temperature controller) for 24 hours (t/tgel=0.24). This sol was found to be very stable for 3 months when stored in a freezer at −30° C.

1.B. Sol Deposition

The A2 sol and a precalcined and cleaned support were placed in the antechamber of a glove box on a continuous purge with dry nitrogen. For ease of handling, Membralox® supports (U.S. Filter) cut into 5 cm sections were used. The antechamber was purged for 30 minutes with 8 lit./min. of dry nitrogen. After purging, the sol and the support were moved inside the main glove box. The dip-coating on the commercial Membralox® support was performed using a Compumotor® linear translation stage. The support was lowered into the sol at a rate of 20 cm/min. and held undisturbed for 100 seconds before being pulled out at the rate of 20 cm/min. After the coated support had dried undisturbed for 2 min., the bottle containing the sol was closed. The coated support was subsequently left undisturbed for another 13 minutes, resulting in a support coated with a polymeric silica layer. The A2 sol and the coated support were then removed from the dry box. The coated support was then stored until the subsequent calcination step. See 1D.

1.C. Preparation of Supports Coated With Two Polymeric Silica Layers

A support coated with a silica polymeric layer prepared according to 1.A–B was coated with a second polymeric layer according to the process described in 1.B. The twice-coated support was stored for subsequent calcination.

1.D. Preparation of Supported Inorganic Membranes Through Calcination of Polymeric Silica Coated Supports Three different supported inorganic membranes were prepared as described in 1.D.1.–1.D.3.

1.D.1—The coated support prepared in 1.B. was calcined to 400° C. in a programmable furnace. For calcination, the support was heated at a rate of 1° C./min to the target temperature 400° C. The coated support was held isothermally for 3 hours at the target temperature and then cooled at a rate of 1° C./min to 150° C., where it was held isothermally until characterization. 1.D.2.—The coated support prepared in 1.B. was calcined to 550° C. in a programmable furnace. As in 1.D.1, for calcination, the support was heated at a rate of 1° C./min to the target temperature 550° C. The coated support was held isothermally for 3 hours at the target temperature and then cooled at rate of 1° C./min to 150° C., where is was held isothermally until characterization. 1.D.3—The coated support prepared in 1.C. was calcined to 400° C. according to the process described in 1.D.1.

1.E.—Membrane Characterization

The membranes produced in 1.D.1. to 1.D.3. were characterized using a single gas permeability measurement system. The membrane ends were sealed using Viton® or Grafoil® gasket material, and the compression of the gasket avoided by-passing of the gases. A custom built automated flow system was used to measure the permeance (flux/pressure) of five different gases through the membrane. The gases were chosen to give a range of gas molecule sizes. These gases, along with their characteristic diameters, are: He (2.65 Å), $H_2$ (2.89 Å), $CO_2$ (3.3 Å), $N_2$ (3.64 Å), and $CH_4$ (3.8 Å). Apart from the different sizes, the inert gases have different chemical interactions with the membrane surface. Thus, the flow through the membrane will be a combination of Knudsen diffusion, surface diffusion and micropore diffusion. The relative contribution from each of the above flow mechanisms varies according to the gas, as well as the pore size of the membrane.

The membranes were measured over a temperature range of 40° C. to 220° C. (upper limit for the Viton® gasket). The flow through the membranes was measured with two bubble meters installed on the exhaust line. The results obtained from the single gas permeability measurements were reported as permeance ($cm^3/cm^2$-s-cm-Hg) vs measurement temperature and the ideal selectivity $\alpha_{1/2}$ (flux of pure gas 1/flux of pure gas 2) vs temperature.

The characterization data for each of the membranes prepared in 1.D.1.–1.D.3. are provided in Table 1 below.

TABLE 1

Single gas permeability measurement and selectivity results on A2** membranes as prepared in 1.D

|  | He Perm. | He/$N_2$ | He/$C_3H_6$ | He/$CO_2$ | He/$CH_4$ | He/$SF_6$ | $CO_2$/$CH_4$ |
|---|---|---|---|---|---|---|---|
| Ideal Knudsen | — | 2.65 | 3.24 | 3.31 | 2.0 | 6.0 | 0.6 |
| 1 layer A2** membrane, 400° C. | 0.0085 | 2.0 | 1.8 | 2.4 | 1.6 | 4.0 | 0.66 |
| 2 layer A** membrane, 400° C. | 0.0021 | 6.9 | 4.7 | 0.74 | 2.6 | 11.8 | 3.5 |
| 1 layer A2** membrane, 550° C. | 0.0028 | 9.0 | 5.2 | 4.4 | 6.8 | 16.8 | 1.6 |

The results demonstrate that the double layer A2 membrane exhibits superior seiving characteristics as compared to a single layer A2 membrane. The results further demonstrate that single A2 membranes calcined to 550° C. exhibit superior separation characteristics compared to membranes calcined at 400° C. Membranes calcined at 550° C. exhibit much higher selectivity for most gases than single coated membranes calcined to 400° C. and better flux and selectivity than A2 membranes prepared with two coatings.

Example 2

Effect of Deposition and Drying of a Silica Polymeric Sol Under Conditions of Low Relative Pressure of the Liquid Constituents of the Sol The A2** sol prepared in 1.A. and a precalcined, cleaned Membralox® support were placed in the antechamber of a glove box being purged continously with dry nitrogen. The antechamber was purged for 30 minutes with 8 lit./min. of dry nitrogen. After purging, the coating sol and the support were moved inside the main glove box and the box was purged with 8 lit./min. of dry nitrogen. The water content in the box was monitored using a $TiCl_4$ solution by periodically opening the bottle containing the $TiCl_4$ solution. The chamber atmosphere was determined to comprise less than 10 ppm water when no fumes resulted following exposure of the $TiCl_4$ solution.

After the atmosphere was determined to have less than 10 ppm water, the container comprising the coating sol was opened. The Membralox® support was dip-coated using a Compumotor® linear translation stage. The support was lowered into the sol at a rate of 20 cm/min. and held undisturbed for 100 seconds before being withdrawn at a rate of 20 cm/min.

The sol container was closed after 1 minute of drying and the membrane was left undisturbed for another 15 minutes. The coating sol and the membrane were subsequently removed from the dry glove box and the membrane was placed in a Fisher® model 495A programmable furnace. The membrane was heated to 550° C. at a rate of 1° C./min, held isothermally for 3 hours and then cooled at a rate of 1° C./min. to 150° C. The membrane was maintained at 150° C. prior to measurement.

The single gas permeance and ideal separation factors for the resultant membrane were measured, and the results are provided in Table 2 below. The average pressure across the membrane for all the measurements was 52 psia.

TABLE 2

Single gas permeance and selectivity versus the temperature

| Temp (°C.) | He Perm. | $\alpha$He/H$_2$ | $\alpha$He/N$_2$ | $\alpha$He/CO$_2$ | $\alpha$He/CH$_4$ | $\alpha$CO$_2$/CH$_4$ | $\alpha$N$_2$/CH$_4$ |
|---|---|---|---|---|---|---|---|
| 40 | 2.25e-05 | 2.54 | >300 | >200 | >500 | NM | NM |
| 80 | 5.62e-05 | 0.87 | >800 | 3.44 | >800 | >200 | NM |
| 120 | 8.20e-05 | 0.90 | >900 | 3.71 | >900 | >200 | NM |
| 160 | 1.11e-04 | 0.87 | 100 | 5.36 | >1500 | >300 | >15 |
| 190 | 1.35e-04 | 0.89 | 16.2 | 6.61 | >2000 | >300 | >90 |
| 220 | 1.36e-04 | 0.80 | 14.1 | 4.00 | >2000 | >400 | >100 |

NM = Not measureable.

The above results demonstrate that an A2** membrane is capable of completely separating gaseous molecules at various temperatures. When the CO$_2$/CH$_4$ selectivity of the above prepared membrane is compared with the best organic polymeric membranes, it is observed that for equivalent fluxes, the above membrane exhibits gas selectivity which exceeds the selectivity of organic polymeric membranes by orders of magnitude.

Example 3
Surface Derivatized Inorganic Microporous Membranes

The surface of an inorganic membrane as prepared in 1.D.2 was derivatized as follows. A surface derivatization solution (5 vol. % Ti (O i-Pr)$_4$ in tetrahydrofuran (THF)), hexane, toluene and the supported inorganic membrane were placed in the antechamber of a glove box which was being purged continuously with dry nitrogen. The Ti(O i-Pr)$_4$ solution, hexane and toluene were freshly distilled to remove any trace amounts of water. The antechamber was purged for 30 minutes with 8 lit./min. of dry nitrogen. After purging, the three solutions and the membrane were moved inside the main glove box and the box was purged with 8 lit./min. of dry nitrogen. The water content in the box was checked using TiCl$_4$ solution, as described in Example 1. When the chamber atmosphere was confirmed to comprise less than 10 ppm water, the surface derivatization solution container was opened and the membrane was suspended into derivatization solution with a Compumotor® linear translation stage. The membrane was allowed to react with the solution for five minutes. The solution container was then closed off and the membrane was allowed to dry inside the dry box for 2 min. The dried membrane was then washed repeatedly with hexane followed by toluene to remove any excess unreacted titania precursor. The membrane was allowed to dry for another five minutes before being removed from the box.

The dried membrane was then placed in a Fisher model 495A programmable furnace for calcination to 400° C. at the rate of 1° C./min. and after a hold time of 3 hours at 400° C., a cool down at the rate of 1° C./min. to 150° C. The resultant surface derivatized membrane was maintained at 150° C. until measurement.

3.A. The above process was repeated and the resultant membrane was characterized for single gas permeance, as described above, and the results are provided in Table 3. The average pressure across the membrane during the characterization was 52 psia, with a pressure differential of 80 psi.

TABLE 3

Ideal separation factors versus temperature results for an A2** membrane derivitized two times with Ti(O i-Pr)$_4$

| Temp (°C.) | He Perm. | $\alpha$He/H$_2$ | $\alpha$He/N$_2$ | $\alpha$He/CO$_2$ | $\alpha$He/CH$_4$ | $\alpha$CO$_2$/CH$_4$ | $\alpha$N$_2$/CH$_4$ |
|---|---|---|---|---|---|---|---|
| 40 | 0.00012 | 0.53 | 2.8 | 1.26 | 2.0 | 1.6 | 0.71 |
| 80 | 0.00037 | 0.99 | 11.8 | 2.45 | 10.3 | 4.2 | 0.87 |
| 120 | 0.00048 | 0.98 | 16.4 | 2.78 | 18.5 | 6.7 | 1.13 |
| 160 | 0.00065 | 0.96 | 16.7 | 3.11 | 22.3 | 7.2 | 1.33 |
| 200 | 0.00135 | 0.95 | 19.6 | 3.98 | 25.0 | 6.3 | 1.27 |

3.B. The derivatization process described above was repeated twice and the resultant membrane was characterized for single gas permeance and selectivity, as described above, and the results are provided in Table 4. The average pressure accross the membrane during the characterization was 52 psia, with a pressure differential of 80 psi.

Depending on temperature and molecuar size, the flux of some gases falls below the resolution limit of our permeability measurement system which is $<\sim 10^{-7}$ cm$^3$/cm$^2$-s-cm Hg. This establishes a minimum separation factor. In Tables 2 & 4, the results for these cases are listed as greater than a particular value.

TABLE 4

Ideal separation factors versus the temperature results for an A2** membrane derivatized three times with Ti (O i-Pr)$_4$.

| Temp (°C.) | He Perm. | $\alpha$He/H$_2$ | $\alpha$He/N$_2$ | $\alpha$He/CO$_2$ | $\alpha$He/CH$_4$ | $\alpha$CO$_2$/CH$_4$ | $\alpha$N$_2$/CH$_4$ |
|---|---|---|---|---|---|---|---|
| 40 | 2.81e-06 | 1.45 | >250 | 1.21 | >300 | >200 | NM |
| 80 | 1.01e-05 | 1.43 | >250 | 2.72 | >300 | >200 | NM |
| 120 | 1.64e-05 | 1.10 | 17.7 | 2.68 | >400 | >200 | >10 |
| 160 | 2.86e-04 | 1.05 | 18.3 | 3.38 | >500 | >300 | >20 |
| 190 | 4.06e-04 | 1.02 | 17.7 | 3.80 | >500 | >300 | >20 |
| 220 | 5.41e-04 | 0.99 | 17.2 | 4.03 | 58.5 | 14.5 | 3.4 |

NM = Not measurable

From a cross-sectional transmission electron micrograph of the membrane, a pure silica layer supported on a γ-Al$_2$O$_3$ support can be seen. The surface of the pure silica layer shows the titania modification of the membrane. This modification layer is ~10 nm thick and an EDS analysis of the area 50 nm below the Si-O-Ti interface does not indicate the presence of any titania. The above result proves that the pores are modified only at the membrane/TiO$_2$ interface. The additional nanocrystalline TiO$_2$ deposited on top of the modified SiO$_2$/TiO$_2$ interface is expected to have a pore diameter greater than 20 Å and thus does not contribute to enhanced separation nor does it strongly reduce flux.

From the above results, it can be seen that improved selectivity can be acheived with supported inorganic membranes through surface derivatization according to the process described above.

Example 4
Preparation of Active Catalyst Membranes

The surface of a supported inorganic membrane prepared according to 1.D.3. is derivatized with a solution of sodium titanium iso-propoxide [NaTi (OCHMe$_2$)$_5$]in THF. The excess reactant is washed away using freshly distilled hexane and toluene. The amount of water in the silica membrane controlled the thickness and morphology of the active catalyst layer deposited on the membrane. The deposited isopropoxide was converted to the active catalyst layer of sodium titanate by controlled calcination to at least 250° C.

Example 5
Separation of a Complex, Gaseous Mixture of Small Molecules

A gaseous mixture of He, H$_2$, CO$_2$, N$_2$ and CH$_4$ is contacted with a first membrane prepared according to Example 2, where the membrane is at 10° C. Upon contact, He passes through the membrane and is separated from the mixture. The remaining gaseous mixture is then contacted with a second membrane at 40° C. Upon contact, H$_2$ passes through the membrane, while the remaining gaseous components stay in the mixture. The remaining mixture is then contacted with a third membrane at 70° C., whereby CO$_2$ passes through the membrane and is separated from the remaining N$_2$ and CH$_4$. As a last step, the mixture of N$_2$ and CH$_4$ is contacted with a fourth membrane at 200° C., whereby the N$_2$ passes through the membrane and the CH$_4$ does not. Thus, by contacting the complex gaseous mixture with a series of membranes at different temperatures, the components of the gaseous mixture are separated.

It is evident from the above results and discussion that supported inorganic membranes are provided which are capable of molecular sieving. The membranes exhibit high flux and high selectivity, and are more physically and chemically stable as compared to organic membranes. Surface derivatization of supported inorganic membranes according to the subject invention provides for membranes having improved selectivity, as well as membranes suitable for use as catalysts, catalyst supports and the like.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A supported inorganic membrane capable of molecular sieving, said supported inorganic membrane comprising:
    a porous substrate; and
    an inorganic membrane coating the surface of said porous substrate, wherein said inorganic membrane has: a thickness of less than about 100 nm and pores having average critical pore radii of less than about 5 Å.

2. The supported inorganic membrane according to claim 1, wherein the pores of said porous substrate have radii ranging from 30 to 60 Å.

3. The supported inorganic membrane according to claim 2, wherein said porous substrate is an alumina substrate.

4. The supported inorganic membrane of claim 1, wherein said inorganic membrane is silica.

5. A supported inorganic membrane capable of molecular sieving, said supported inorganic membrane comprising:
    a porous alumina substrate having pores with radii ranging from 30 to 60 Å; and
    an inorganic silica membrane coating the surface of said porous substrate, wherein said inorganic silica membrane has a thickness of less than about 100 nm and pores having average critical pore radii of less than about 5 Å.

6. A method for producing a supported inorganic membrane capable of molecular sieving, wherein said membrane has a thickness of less than about 100 nm and comprises pores having average critical pore radii of less than about 5 Å, said method comprising the steps of:
    (a) contacting a porous substrate with an inorganic polymeric sol to produce a sol coated substrate, wherein said inorganic polymeric sol comprises inorganic polymers having a low fractal dimension;
    (b) drying said sol coated substrate to produce an inorganic polymeric coated substrate; and
    (c) calcining said inorganic polymeric coated substrate to produce said supported inorganic membrane.

7. The method according to claim 6, wherein steps (a) and (b) are repeated at least once prior to step (c).

8. The method according to claim 7, wherein said calcination step is at a temperature ranging from 400° to 600° C.

9. The method according to claim 6, wherein said calcination step is at a temperature ranging from 500° to 600° C.

10. A method for producing a supported inorganic membrane capable of molecular sieving, wherein said membrane has a thickness of less than about 100 nm and comprises pores having average critical pore radii of less than about 5 Å, said method comprising the steps of:

(a) contacting a porous substrate with an inorganic polymeric sol to produce a sol coated substrate, wherein said inorganic polymeric sol comprises inorganic polymers having a low fractal dimension;

(b) drying said sol coated substrate under conditions of low relative pressure of the liquid constituents of said sol to produce an inorganic polymeric coated substrate; and (c) calcining said inorganic polymeric coated substrate to produce said supported inorganic membrane.

11. The method according to claim 10, wherein the average diameter of said inorganic polymers of said sol used to coat said porous substrate exceeds the diameter of the substrate pores.

12. The method according to claim 10, wherein the fractal dimension of said inorganic polymers of said sol does not exceed 2.

13. The method according to claim 10, wherein said inorganic polymers of said sol used to coat said porous substrate are silica polymers.

14. The method according to claim 10, wherein said conditions of low relative pressure are substantially anhydrous.

15. The method according to claim 10, wherein said calcination is to a temperature ranging from 400° to 600° C.

16. A membrane produced according to the method of claim 10.

17. The membrane according to claim 16, wherein said membrane comprises pores with average critical radii of less than 4 Å.

18. The membrane according to claim 16, wherein said membrane comprises pores with average critical radii of less than 3 Å.

19. The membrane according to claim 16, wherein said membrane comprises pores with average critical radii of less than 2 Å.

20. A method of producing a supported inorganic membrane capable of molecular sieving, wherein said membrane has a thickness of less than about 100 nm and comprises pores having average critical pore radii of less than about 5 Å, said method comprising the steps of:

(a) contacting a porous substrate with an inorganic silica polymeric sol to produce a sol coated substrate, wherein said inorganic polymeric sol comprises inorganic polymers having a fractal dimension of less than 2 and an average diameter greater than the porous substrate pore diameter;

(b) drying said sol coated substrate under conditions of low relative pressure of the liquid constituents of said sol, wherein said conditions are substantially anhydrous, to produce an inorganic polymeric coated substrate; and (c) calcining said inorganic polymeric coated substrate to a temperature between about 400° and 600° C.;

whereby said supported inorganic membrane capable of molecular sieving is produced.

21. The method according to claim 20, wherein said porous substrate coated by said sol is alumina.

22. The method according to claim 20, wherein said polymeric silica sol is prepared and deposited under conditions of low condensation rate.

23. A metal oxide surface derivatized supported inorganic membrane comprising:

a porous substrate;

an inorganic membrane coating the surface of said substrate, wherein said inorganic membrane has a thickness of less than about 100 nm, pores having average critical pore radii of less than about 5 Å, and a narrow pore radius distribution; and a metal oxide layer coating the surface of said inorganic membrane.

24. The supported inorganic membrane according to claim 23, wherein said porous substrate is alumina.

25. The supported inorganic membrane according to claim 23, wherein said inorganic membrane is silica.

26. The supported inorganic membrane according to claim 23, wherein said metal oxide layer is a titanium oxide layer.

27. The supported inorganic membrane according to claim 23, wherein said metal oxide layer is 0.5 to 100 nm thick.

28. A metal oxide surface derivatized supported inorganic membrane comprising:

an alumina porous substrate;

an inorganic silica membrane coating the surface of said porous substrate, wherein said inorganic membrane has a thickness of less than about 100 nm, pores having average critical pore radii of less than about 5 Å, and a narrow pore radius distribution; and a titanium oxide layer coating the surface of said inorganic membrane, wherein said titanium oxide layer is 0.5 to 100 nm thick.

29. A method for producing a metal oxide surface derivatized supported inorganic membrane, wherein said membrane has a thickness of less than about 100 nm and comprises pores having average critical pore radii of less than about 5 Å, said method comprising the step of:

coating said supported inorganic membrane at least once with a metal alkoxide solution under substantially anhydrous conditions to produce the metal oxide surface derivatized supported inorganic membrane.

30. The method according to claim 29, wherein said method further comprises calcining said metal alkoxide coated supported inorganic membrane to a temperature ranging from 300° to 400° C.

31. The method according to claim 29, wherein said method comprises coating said supported inorganic membrane with said metal alkoxide solution at least twice.

32. The method according to claim 29, wherein said inorganic membrane is silica.

33. The method according to claim 29, wherein the pores of said inorganic silica membrane comprise water.

34. The method according to claim 29, wherein said metal alkoxide is a titanium alkoxide.

35. The method according to claim 29, wherein said metal alkoxide is an alkali metal alkoxide.

36. The method according to claim 35, wherein said alkali metal alkoxide is a sodium titanium alkoxide.

37. A method for producing a titanium oxide surface derivatized supported inorganic silica membrane, wherein said membrane has a thickness of less than about 100 nm and comprises pores having critical pore radii of less than about 5 Å, said method comprising the steps of:

(a) contacting said supported inorganic silica membrane with a titanium alkoxide solution under substantially anhydrous conditions to produce a titanium alkoxide coated membrane;

(b) drying said titanium alkoxide coated membrane under substantially anhydrous conditions; and (c) calcining said dried titanium alkoxide coated membrane to produce a supported inorganic silica membrane coated with a layer of titanium oxide.

38. The method according to claim 37, wherein said alkali titanate layer is from about 0.5 to 100 nm thick.

39. A method for separating the molecular components of a gaseous stream comprising a mixture of small molecules, said method comprising:

sequentially contacting said gaseous stream with a plurality of supported inorganic membranes capable of molecular sieving, wherein the temperature of each membrane is greater than the temperature of the previously contacted membrane, whereby the molecular components of said gaseous stream are separated.

40. The method according to claim 39, wherein said supported inorganic membranes capable of molecular sieving have a thickness of less than about 100 nm and pores having average critical pore radii of less than about 5 Å.

* * * * *